United States Patent [19]

Mizutani et al.

[11] Patent Number: 4,875,918
[45] Date of Patent: Oct. 24, 1989

[54] METHOD OF MANUFACTURING FIBER PREFORM FOR SINGLE-MODE FIBERS

[75] Inventors: Futoshi Mizutani; Takeshi Kyogoku; Tatsuo Saitoh; Shigeki Endoh, all of Kanagawa, Japan

[73] Assignee: Sumitomo Electric Industries, Ltd., Osaka, Japan

[21] Appl. No.: 289,399

[22] Filed: Dec. 19, 1988

Related U.S. Application Data

[63] Continuation of Ser. No. 70,001, Jul. 6, 1987, abandoned.

[30] Foreign Application Priority Data

Jul. 3, 1986 [JP] Japan ................................ 61-155021

[51] Int. Cl.⁴ .......................................... C03B 37/018
[52] U.S. Cl. ...................... 65/3.12; 65/3.11; 65/900
[58] Field of Search ..................... 65/3.11, 3.12, 3.2, 65/18.2, 18.3, 30.1, 30.13, 900

[56] References Cited

U.S. PATENT DOCUMENTS

| | | | |
|---|---|---|---|
| 3,933,454 | 1/1976 | DeLuca | 65/900 |
| 4,310,341 | 1/1982 | Barns et al. | 65/3.12 |
| 4,599,098 | 7/1986 | Sarkar | 65/3.12 |
| 4,620,861 | 11/1986 | Berkey | 65/3.12 |
| 4,675,040 | 6/1987 | Tanaka et al. | 65/3.12 |

FOREIGN PATENT DOCUMENTS 56-160334 12/1981 Japan ................................ 65/900

*Primary Examiner*—Peter Kratz
*Attorney, Agent, or Firm*—Sughrue, Mion, Zinn, Macpeak & Seas

[57] ABSTRACT

A method of manufacturing a glass fiber preform in which a quartz glass rod having an outer coating containing chlorine and a core doped for higher refractive index has blown thereon a soot formed by a burner fed with quartz glass raw material and a chlorine group gas undergoing flame hydrolysis. The resulting composite is the heated and fused to collapse.

6 Claims, 1 Drawing Sheet

METHOD OF MANUFACTURING FIBER PREFORM FOR SINGLE-MODE FIBERS

This is a continuation of application Ser. No. 07/070,001, filed 7/6/87, now abandoned.

BACKGROUND OF THE INVENTION

1. Field of the Invention

The present invention relates to a method of manufacturing a glass fiber preform for single-mode optical fibers.

2. Background of the Prior Art

There has been well-known a method of manufacturing a glass fiber preform for single-mode fibers. In this method, a glass raw material is subject to a flame hydrolysis reaction, or the like, to form a porous glass body composed of a core and a cladding. The resultant porous glass body is dehydrated and sintered so as to obtain a collapsed intermediate glass rod. Porous quartz glass is further formed by the above-mentioned method at the outside of the obtained intermediate glass rod composed of the core and the cladding. The thus obtained composition is sintered or dehydrated and sintered to thereby obtain a required cladding thickness.

In the above-mentioned conventional method, the dehydration effected in producing the intermediate glass rod is very important to keep the transmission loss low when the glass fiber preform is used for making optical fibers. Therefore, a method is employed in which a gas of the chlorine group is contained in an atmosphere as a dehydrating agent. However, chlorine remains in the sintered intermediate body to make the refractive index of the cladding a little high so that a step in the refractive index is undesirably produced between the intermediate glass rod and the glass to be formed at the outside of the intermediate glass rod. As a result, the effective cut-off wavelength for a non-transmitted high order mode (hereinafter referred to simply as "cut off wavelength") is increased in the transmission characteristics of the optical fibers. Therefore, a method is employed in which dehydration treatment is performed by using a gas in the chlorine group as a dehydrating agent when the porous glass outside an intermediate glass body is collapsed similarly as in the case of the intermediate body (U.S. Pat. No. 4,486,212). In this method, as shown in FIG. 1, a porous glass body 2' is subject to heat treatment in an atmosphere containing a gas of the chlorine group. A heater 8 surrounds a furnace central tube 9. This method has disadvantages in that it is difficult to homogeneously incorporate the chlorine group within the porous glass body 2' because it takes a long time for the chlorine group gas to diffuse and permeate into the inside of the porous glass body 2' to react with the glass body. A further disadvantage is that if the concentration of the chlorine group gas is increased to shorten the treatment time, an excessive portion of the chlorine group gas is apt to remain as bubbles in the step of collapsing the porous glass body 2'.

As described above, in the method disclosed in U.S. Pat. No. 4,486,212, there have been such problems that when a complex of a porous glass body and an intermediate glass rod is inserted into an atmosphere containing a gas of a chlorine group in the inside of a furnace so as to be subject to treatment such as heating and dehydration (or the addition of chlorine), it takes a long time for performing the treatment homogeneously in the inside of the complex. Furthermore, if the concentration of the chlorine gas group is made higher to shorten the treatment time, an excessive part of the chlorine gas remains so that bubbles may remain in the inside of the collapsed body in the sintering treatment.

SUMMARY OF THE INVENTION

The present invention is intended to solve the problems in the conventional method as described above. Specifically, it is an object of the invention to provide a method of manufacturing a glass fiber preform for single-mode fibers in which there are no residual bubbles, in which chlorine can be homogeneously added to a porous glass body, and by which optical fibers having desirable transmission characteristics can be obtained.

According to the present invention, the method of manufacturing a glass fiber preform for single-mode fibers is characterized by preparing a starting material of a glass rod provided with an outer coating made of quartz glass containing chlorine and a core made of quartz glass containing a component for increasing the refractive index. A quartz glass raw material and a gas containing chlorine are introduced into a burner to form quartz glass soot by a flame hydrolysis reaction. The quartz glass soot is blown onto the starting material to obtain a complex of the quartz glass soot and the glass rod. The complex is heated and fused to collapse the complex.

It is preferable in the present invention to employ a gas containing one kind or more gases selected from a group consisting of a chlorine gas, a thionyl chloride gas, and a carbon tetrachloride gas, or a gas obtained by adding an inert gas to the one kind or more selected from the group.

DETAILED DESCRIPTION OF THE PREFERRED EMBODIMENTS

Figure 2:
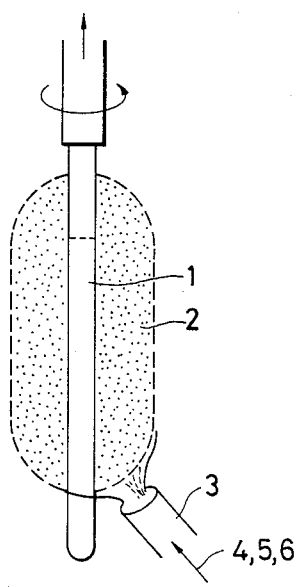
FIG. 2 is a schematic view for explaining an apparatus for practicing the present invention.

Referring to the drawings, the present invention will be specifically described. FIG. 2 is a schematic view showing an embodiment of the present invention. A glass rod 1 is composed of an outer coating made of quartz glass containing chlorine and a core made of quartz glass containing a component for making the refractive index high. Similarly to the conventional method, such a glass rod can be obtained through a method in which a porous glass body is dehydrated and sintered so as to be collapsed in an atmosphere containing chlorine. The porous glass body is produced through a method such as a VAD (vapor-phase axial deposition) method, an OVD (outside vapor-phase deposition) method, or the like, in which a glass raw material is subject to flame-hydrolysis. Alternatively, the porous glass body can be prepared through a method in which soot powder is formed and molded with pressure, or through any other suitable method.

According to the present invention, when the porous glass 2 is formed on the outer circumference of the intermediate glass rod 1, a gas of chlorine group 6 is fed into a burner 3 together with a flame gas 4 and a glass raw material gas 5 so that chlorine is made to be homogeneously contained in the porous glass 2. The thus obtained complex is inserted in a furnace so as to be heated and fused to thereby be integrated.

Preferably, according to the present invention, a gas containing one or more gases selected, from a group consisting of chlorine gas, thionyl chloride gas, and carbon tetrachloride is used as the gas containing chlorine. Or it is possible to use a gas obtained by adding an inert gas such as He, Ar, or the like, to the above-mentioned one or more gas selected from the group to thereby dilute the latter.

According to the method of the present invention, in forming glass at the outer circumference of the intermediate glass body, if a chlorine group is blown together with a glass raw material during forming porous glass, chlorine can be homogeneously added into the porous glass body. Bubbles can be prevented from remaining while the porous glass body is heated so as to be collapsed in a furnace.

In the conventional method, as described above, an atmosphere containing a gas in a group of chlorine diffuses and penetrates into the inside of the porous glass body 2' so as to cause a reaction with the porous glass body to thereby be added thereto. In the method according to the present invention, on the contrary, it is considered that chlorine can be homogeneously added because it forms the porous glass 2 to which chlorine is directly added, and that generation of bubbles can be prevented because an excessive amount of the chlorine group gas hardly remains.

Adjustment of the quantity of addition of chlorine is performed by the adjustment of the mixing ratio of the glass raw material gas, the flame gas, the inert gas and the gas in a group of chlorine.

EXAMPLE 1

Figure 3:
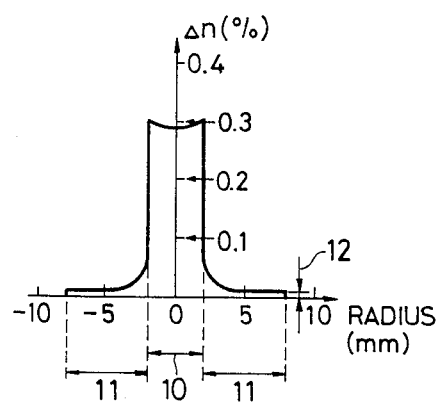
FIG. 3 is a diagram showing the refractive index distribution of the intermediate glass rod used in the embodiment of the present invention.

A sintered body produced through the VAD method and substantially composed of a core of $GeO_2$ - $SiO_2$ and a cladding of $SiO_2$ was subject to drawing so as to produce the intermediate glass rod 1 having an outer diameter of 16 mm and a length of 500 mm. The distribution of the differential refractive index (hereinafter referred to as "Δn distribution") was such that, as shown in FIG. 3, the differential refractive index of a core 10 was 0.3%. The structure was such that the ratio of an outer diameter of a cladding 11 to that of the core 10 was 5. A residual layer 12 of chlorine owing to dehydration had a differential refractive index of 0.015%. All the above-mentioned differential refractive indices were expressed as a ratio to pure silica.

Next after being polished by an oxyhydrogen flame, the intermediate glass rod 1 was mounted on a soot forming instrument for VAD method arranged as shown in FIG. 2. The gas 4 consisting of oxygen of 44 l/min, hydrogen of 40 l/min, and a sealing Ar gas of 13.8 l/min was fed into an oxyhydrogen burner 3 to form a flame. Additionally, silicon tetrachloride 5 of 52.3 l/min has fed together with thionyl chloride gas 6 of 0.13 l/min into the oxyhydrogen burner 3 so that the porous glass body 2 was formed on the intermediate glass rod 1.

Figure 4:
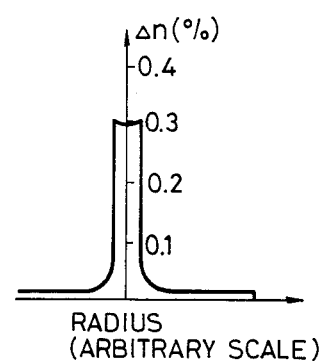
FIG. 4 is a diagram showing the refractive index distribution of the glass fiber preform manufactured according to the present invention.

Then, the complex of the intermediate glass rod 1 and the porous glass body 2 was inserted into a furnace so as to be collapsed. The drawing furnace had an atmosphere of helium gas and a furnace temperature of 1710 ° C. The drawing speed within the furnace was 8 mm/min. The thus obtained collapsed preform was subject to drawing and the Δn distribution was measured. As shown in FIG. 4, no stepped portions were found in the refractive index of the cladding but the Δn distribution was equal longitudinally as well as radially. The glass fiber preform was flame-polished and was subject to drawing to be made into fibers. As the result of measurement, the effective cut-off wavelength of the fibers was 1.26 μm which was a proper value matching other properties of the transmission characteristics.

COMPARATIVE EXAMPLE 1

A glass fiber preform was produced under the very same conditions except that the thionyl chloride 6 was not supplied in forming the porous glass body 2'. The resultant glass fiber preform was made into fibers. The effective cut-off wavelength of the fibers was measured. The effective cut-off wavelength was 1.30 μm which was larger by 0.04 μm than that in the Example 1 of the invention. This effective cut-off wavelength of the comparative example is an undesirable value in view of matching properties with respect to other characteristic values.

COMPARATIVE EXAMPLE 2

Figure 1:
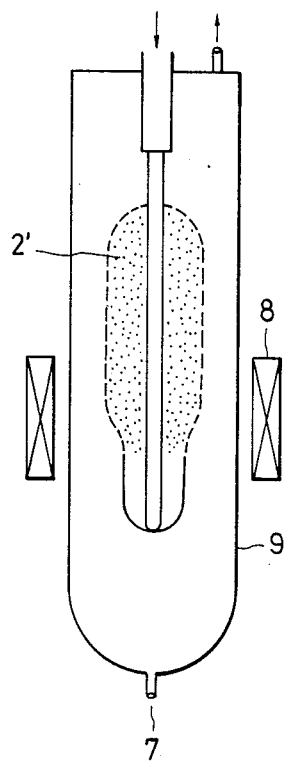
FIG. 1 is a schematic view for explaining the conventional method.

The porous glass body 2' was produced under the was inserted into a furnace as shown in FIG. 1 so as to be collapsed in an atmosphere of a mixture of a chlorine gas of 0.3 l/min and a helium gas of 15 l/min, at a furnace temperature of 1710 ° C. and at a drawing speed of 8 mm/min. A number of minute bubbles remained in the boundary surface between the intermediate glass rod 1 and the porous glass body 2'. Further, the content of chlorine was investigated through EDX (energy dispersive X-ray spectroscopy). The result proved that the distribution of the content of chlorine was not homogeneous both radially and longitudinally. It was presumed that the glass fiber preform had undesirable characteristic for optical fibers.

EXAMPLE 2

A collapsed preform was produced under the very same conditions as those of the example 1 except that a mixed gas of a helium gas of 0.1 l/min and a chlorine gas of 0.16 l/min were used instead of the thionyl chloride gas. The obtained solid mother material was subject to drawing and the Δn distribution was measured. As shown in FIG. 4, no step was found in the refractive index of the cladding but the Δn distribution was equal longitudinally as well as radially. The glass fiber preform was flame-polished and was subject to drawing to be made into fibers. As the result of measurement, the effective cutoff wavelength of the fibers was 1.26 μm which was the same value as that in the Example 1 of the invention and which was proper with respect to other transmission characteristic values.

As described above, according to the present invention, there are such effects that chlorine can be homogeneously added in the forming portion of the porous glass body with no residual bubbles, so that a good characteristic as optical fibers can be obtained. The present invention is intended so that when an outer cladding is formed on an intermediate glass rod having a cladding of substantially pure silica to which chlorine has been added through dehydration by a gas in a group of chlorine, and when the substantially pure silica has a higher refractive index than that of the original pure silica glass owing to the content of chlorine or any other reason, chlorine is added in accordance with the refractive index in order to improve the characteristics of the glass fiber preform as optical fibers. The use of the intermediate glass rod itself is not limited to the VAD method is but applicable to any other manufacturing method.

Further, in forming the outer clad portion, the invention is not limited to the VAD method shown in FIG. 2 but can use other well-known methods such as OVD, or the like by adjusting the ratio of the flame gas, the glass raw material gas, and the chlorine gas to be fed into the burner.

What is claimed is:

1. A method of manufacturing a glass fiber preform, comprising the steps of:

preparing a starting material of a glass rod provided with an outer coating made at least partially of quartz glass containing chlorine and a core made at least partially of quartz glass containing a component for increasing a refractive index of said quartz glass;

introducing a quartz glass raw material containing silicon and a gas containing chlorine simultaneously into a burner;

performing a flame hydrolysis reaction on said quartz glass raw material containing silicon and said gas containing chlorine to form quartz glass soot, such that said as containing chlorine is dispersed homogeneously within said quartz glass soot;

blowing said quartz glass soot to said starting material to obtain a complex of said quartz glass soot and said glass rod; and heating and fusing said complex to collapse said complex so as to remove bubbles from said complex.

2. A method of manufacturing a glass fiber preform according to claim 1 wherein said gas containing chlorine comprises at least one member selected from a group consisting of molecular chlorine gas, thionyl chloride gas, and carbon tetrachloride gas.

3. A method of manufacturing a glass fiber preform according to claim 2, wherein said gas containing chlorine further comprises an inert gas.

4. A method of manufacturing a glass fiber preform according to claim 2, wherein said gas containing chlorine comprises said chlorine gas.

5. A method of manufacturing a glass fiber preform according to claim 2, wherein said gas containing chlorine comprises said thionyl chloride gas.

6. A method of manufacturing a glass fiber preform according to claim 2, wherein said gas containing chlorine comprises said carbon tetrachloride gas.

* * * * *